US012188635B2

(12) United States Patent
Lang et al.

(10) Patent No.: US 12,188,635 B2
(45) Date of Patent: Jan. 7, 2025

(54) LUMINAIRE ASSEMBLY WITH REDUCED LIGHT POLLUTION

(71) Applicant: Schreder S.A., Brussels (BE)

(72) Inventors: Vincent Lang, Grâce-Hollogne (BE); Roxane Caprara, Neupré (BE); Benoit Kerff, Liége (BE); Paul Smets, Liége (BE)

(73) Assignee: Schreder S.A., Brussels (BE)

( * ) Notice: Subject to any disclaimer, the term of this patent is extended or adjusted under 35 U.S.C. 154(b) by 194 days.

(21) Appl. No.: 17/757,177

(22) PCT Filed: Dec. 11, 2020

(86) PCT No.: PCT/EP2020/085825
§ 371 (c)(1),
(2) Date: Jun. 10, 2022

(87) PCT Pub. No.: WO2021/116441
PCT Pub. Date: Jun. 17, 2021

(65) Prior Publication Data

US 2023/0016010 A1 Jan. 19, 2023

(30) Foreign Application Priority Data

Dec. 11, 2019 (NL) ...................................... 2024425

(51) Int. Cl.
*F21V 15/01* (2006.01)
*F21S 8/08* (2006.01)
(Continued)

(52) U.S. Cl.
CPC .............. *F21V 15/01* (2013.01); *F21S 8/085* (2013.01); *F21V 13/10* (2013.01); *F21Y 2115/10* (2016.08)

(58) Field of Classification Search
CPC .......... F21V 15/01; F21V 13/10; F21S 8/085; F21Y 2115/10
See application file for complete search history.

(56) References Cited

U.S. PATENT DOCUMENTS

| | | | | |
|---|---|---|---|---|
| 3,366,785 A | | 1/1968 | Huber, Jr. | |
| 4,041,305 A | * | 8/1977 | Dean | F21S 8/088 362/297 |

(Continued)

FOREIGN PATENT DOCUMENTS

| | | | |
|---|---|---|---|
| EP | 2706285 A1 | 3/2014 | |
| EP | 3537029 A1 | 9/2019 | |
| KR | 101761758 B1 | 7/2017 | |

OTHER PUBLICATIONS

PCT International Search Report and Written Opinion, Application No. PCT/EP2020/085825, mailed Jan. 20, 2021, 10 pages.

*Primary Examiner* — Thomas M Sember
(74) *Attorney, Agent, or Firm* — McDonnell Boehnen Hulbert & Berghoff LLP

(57) ABSTRACT

Example embodiments relate to luminaire assemblies with reduced light pollution. One embodiment includes a luminaire assembly that includes a light source. The luminaire assembly also includes a support for carrying the light source. Additionally, the luminaire assembly includes a protector for protecting the light source from external environmental influences. The protector has an open top for accommodating the support, a bottom facing the light source, and a peripheral wall between the open top and the bottom. The peripheral wall includes a transparent or translucent portion. The light source is configured to send light in use through the portion of the peripheral wall. The protector is provided with a light absorbing surface arranged inside of the protector and facing the light source. The light absorbing surface is configured such that in use part of the light emitted
(Continued)

from the light source is absorbed by the light absorbing surface.

20 Claims, 10 Drawing Sheets

(51) Int. Cl.
*F21V 13/10* (2006.01)
*F21Y 115/10* (2016.01)

(56) References Cited

U.S. PATENT DOCUMENTS

| | | | |
|---|---|---|---|
| 5,297,013 A * | 3/1994 | Hall .................... | F21V 21/0824 362/431 |
| 10,267,491 B1 | 4/2019 | Gordin et al. | |
| 2010/0061091 A1 | 3/2010 | Galipeau et al. | |
| 2012/0020061 A1 | 1/2012 | Schefers et al. | |

* cited by examiner

LUMINAIRE ASSEMBLY WITH REDUCED LIGHT POLLUTION

CROSS-REFERENCE TO RELATED APPLICATIONS

The present application is a national stage entry of PCT/EP2020/085825 filed Dec. 11, 2020, which claims priority to NL 2024425 filed on Dec. 11, 2019, the contents of each of which are hereby incorporated by reference.

FIELD OF INVENTION

The present invention relates to luminaire assemblies, in particular outdoor luminaire assemblies having a protector for protecting the light source against external environmental influences. The invention also relates to lamp posts and modular lamp posts comprising such luminaire assemblies.

BACKGROUND

Luminaires, in particular outdoor luminaires, comprise a luminaire housing in which a support with at least one light source is arranged. Typically, the at least one light source comprises a plurality of light-emitting diodes (LEDs). For example, a luminaire may comprise a luminaire pole and a luminaire head formed by the luminaire housing. In other luminaires, the luminaire head may be connected to a wall.

In yet other embodiments as notably disclosed in EP 3 076 073 B1 in the name of the applicant the luminaire may be a modular lamp post which is readily assembled and installed in the field whilst providing rigidity, structural integrity and sealing. The lamp post comprises a plurality of pole modules. The pole modules are connected to one another by respective pole module connectors and one pole module thereof may be connected to a support pole by a pole module connector. EP 3 076 073 B1 is included herein by reference.

Luminaires, in particular outdoor luminaires may further comprise a protective casing comprising a transparent or translucent portion. The protective casing protects the light source from external environmental influences, in particular water and dirt.

Luminaires, in particular outdoor luminaires, are designed for a particular illumination purpose and have often to comply with specific norms regarding light pollution, in particular with respect to the amount of light reflected upwards. More generally the reduction of light pollution is of interest in the field of luminaires.

Some prior art luminaires comprise reflectors arranged to reflect light only in the desirable directions. Other luminaires reduce upwards beams using large hat-shaped elements, increasing the size and cost of the luminaire head.

SUMMARY

The object of embodiments of the invention is to provide a luminaire assembly, in particular for outdoor luminaires, which reduces light pollution in a simple and cost-effective way.

According to a first aspect of the invention, there is provided a luminaire assembly for outdoor luminaires. The luminaire assembly comprises a light source, a support for carrying the light source and a protector. The protector is protecting the light source from external environmental influences, and has an open top for accommodating the support, a bottom facing said light source and a peripheral wall between the open top and the bottom. The peripheral wall comprises a transparent or translucent portion, and the light source is configured to send light in use through said portion of the peripheral wall. Further the protector is provided with a light absorbing surface, the light absorbing surface being arranged inside the protector and facing the light source, the light absorbing surface being configured such that in use part of the light emitted from the light source is absorbed by the light absorbing surface to reduce upward light pollution.

In accordance with said first aspect, light pollution coming from reflections on the bottom of the protector facing the light source is reduced or avoided. In particular second order internal reflections which create upward light emissions are reduced or eliminated, as they will be largely absorbed by the light absorbing surface.

Preferred embodiments relate to luminaire assemblies for outdoor luminaires By outdoor luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas and access roads to private building infrastructures, etc. Such outdoor luminaires may be provided with a side-entry configuration or with a post-top configuration. As will be further set out below, embodiments of the invention allow to assemble both side-entry and post-top luminaires.

According to a preferred embodiment, the light absorbing surface is made of a material configured to absorb more than 80% of visible light that is emitted on the surface thereof, preferably more than 95%.

According to a preferred embodiment, the light absorbing surface is a black layer, preferably a matt black layer. Alternatively other colours having high absorption properties may be used.

Preferably, the peripheral wall and the bottom are formed as one integral protector casing, e.g. a transparent or translucent plastic casing. Alternatively the casing can be made in multiple parts, e.g. two halves, each including half of the peripheral wall and half of the closed bottom.

According to a preferred embodiment, the light absorbing surface is part of a separate element located in an inner area delimited by the peripheral wall of the protector. In this way, standard protective casing can be used as protectors, and the light absorbing element can be added in a simple manner, improving thus the workability in already existing luminaires. The costs are also kept low by avoiding a redesign of the protector.

According to a preferred embodiment, the light absorbing surface extends over at least 90% of a surface of a section through the peripheral wall of the protector. In this way, absorption of the reflections over most of the surface facing the light source where upward light pollution may occur, in particular over most of the bottom surface of the protector can be achieved. Preferably the light absorbing surface covers a portion of the surface facing the light source where upward reflections occur the most. Preferably the light absorbing surface covers the entire surface facing the light source where upward light pollution may occur. Typically, in the mounted position of the assembly, the light absorbing surface will be a substantially horizontally oriented surface but it could also be an inclined surface.

According to a preferred embodiment the light absorbing surface is in a lower half of the protector. Preferably the light absorbing surface is located near the bottom, preferably at less than 5% of the height of the protector from the bottom surface, more preferably directly on the bottom surface.

According to a preferred embodiment the luminaire assembly further comprises a second light source and a second support with the second light source arranged on a lower surface thereof, said second support being arranged between the bottom and the support, wherein the light absorbing surface is arranged above the second support. In this way the upward light pollution of a light module comprising two light sources one above the other can be reduced. Preferably a second light absorbing surface may be arranged inside the protector and facing the second light source. Preferably, the second light absorbing surface is arranged between the second support and the bottom of the protector. The second light absorbing surface may be arranged in a similar manner as the first light absorbing surface.

According to a preferred embodiment, the light absorbing surface is mounted tight inside the inner area delimited by the peripheral wall of the protector. In this way, the light absorbing surface can be fixed without additional fixing means. A mechanical tight mounting technique offers a simple, solid, reliable fixing solution.

According to a preferred embodiment, the protector is made of plastic and the light absorbing surface is made of metal or plastic. Preferably the rigidity of the material of the light absorbing surface is higher than the rigidity of the material of the protector. In this way the tight mounting can be ensured by the difference in rigidity between the materials.

According to a preferred embodiment, the light absorbing surface is adhered to a surface located in an inner area delimited by the peripheral wall of the protector. In this way a cheap and easy alternative manner of fixing the light absorbing surface to the protector is provided.

According to a preferred embodiment, the bottom of the protector is substantially flat. This configuration represents a situation where the invention is particularly advantageous. Indeed second order reflections are particularly creating upward light emissions in case of profound protectors with a flat bottom facing the light source. Alternatively the bottom surface can have a curved shape creating reflections of light upwards.

The bottom of the protector may be an open end or may be a closed bottom. According to a preferred embodiment, the bottom of the protector is closed. In this way the sealing and protection against external influences can be easily achieved According to a preferred embodiment the bottom of the protector has one or more apertures for electrical and/or electronic and/or mechanical connections. The one or more apertures can be for wires. Optionally, the protector of the luminaire assembly can host one or more internal hollow rods for mechanical and/or electrical and/or electronic connections. Optionally, the one or more internal hollow rods may be aligned with the one or more apertures.

According to a preferred embodiment, the light absorbing surface is provided with a collar extending adjacent the peripheral wall of the protector. In this manner, not only the reflections on the bottom surface but also upward reflections on the lower part of the peripheral wall can be absorbed. The height of the collar can be determined based on trade-off considerations between the amount of upward light absorbed and the amount of downward light transmitted. Preferably the height of the collar is less than 10% of the height of the protector, more preferably less than 5% of the height of the protector, even more preferably less than 1% of the height of the protector.

According to a preferred embodiment, a surface area delimited by the open top of the protector is larger than a surface area of the bottom of the protector. Preferably the top surface is at least 10% larger than the bottom one, more preferably at least 20% larger, more preferably at least 50% larger. In particular a bottom surface may have a diameter between 10 and 30 cm and a top surface may have a diameter between 20 and 40 cm.

According to a preferred embodiment, the peripheral wall has a conical shape. The taper of the protector has an influence on the amount of light reflected towards the bottom surface. According to another embodiment, the peripheral wall has a cylindrical shape. Alternatively the shape of the protector may be a combination of a conical and a cylindrical shape.

According to a preferred embodiment, the light absorbing surface is part of a light absorbing coating located in an inner area delimited by the peripheral wall of the protector. A coating layer can be easily added to existing protectors, providing a simple and cost efficient solution to the problem of reducing the light pollution. Preferably the coating layer is located on the bottom surface of the protector.

According to a preferred embodiment, the light absorbing surface is a surface of the protector. For example, a protector can be made of two materials, a light absorbing material for the bottom and a transparent or translucent material for at least part of the peripheral wall. This embodiment may be combined with a further separate absorbing part or as an alternative thereof. In this way, existing protectors may be replaced in a simple manner and without further handling.

According to a preferred embodiment, a height of the peripheral wall of the protector is at least 25 cm, preferably at least 30 cm, more preferably at least 40 cm. More preferably a height of the peripheral wall is between 40 cm and 70 cm.

According to a preferred embodiment, the light source is configured to send light in use through the peripheral wall downwards towards the ground, and said protector is configured such that in use part of the light from the light source is absorbed at the bottom of the protector to reduce light reflected upwards.

According to a preferred embodiment, the light source comprises at least 4 LEDs, preferably at least 8 LEDs, more preferably at least 16 LEDs.

According to a preferred embodiment, an upper cover closes the open top of the protector. In this way the light source may be protected from external influences coming from above the support and upwards light pollution may be further reduced.

According to a preferred embodiment, the dimensions of the cover are bigger than the ones of the open top. In this way further reduction of light pollution may be achieved.

According to a preferred embodiment, a diffuser is provided for diffusing the light from the light source, the diffuser being interposed between the light source and the light absorbing surface. The diffuser may be flat or curved. In preferred embodiments, the diffuser is flat. Alternatively or additionally, at least a portion of peripheral wall of the protector could play the role of a diffusor.

According to a preferred embodiment, at least two brackets are extending between the support and the bottom, along an outer surface of the peripheral wall and arranged for carrying the protector. In this way the luminaire may be configured as a post-top configuration. The brackets may be arranged outside or inside the protector. Along an outer surface implies that the bracket may be right adjacent the outer surface or at a distance thereof, between the support and the bottom.

According to a preferred embodiment, the bottom of the protector is provided with at least two recesses for housing a portion of the at least two brackets.

According to a preferred embodiment the light absorbing surface is shaped with at least two recesses corresponding with the at least two recesses of the bottom. In this manner the light absorbing surface can be fitted inside the protector taking into account a shape of the protector due to mounting considerations.

According to a preferred embodiment, at least one hollow rod is provided extending inside the protector between the support and the bottom, wherein preferably the light absorbing surface is shaped with at least a recess for the at least one hollow rod. Optionally, the at least one hollow rod may be provided with a light absorbing layer, e.g. a black layer.

According to a preferred embodiment, a cylindrical light absorbing ring is provided in the protector, around the light source, wherein the ring is preferably arranged adjacent the peripheral wall of the protector.

Optionally, one or more optical elements, such as lenses and/or reflectors, may be arranged below the light source. The one or more optical elements may comprise a plurality of lens elements associated with the light source, e.g. a plurality of LEDs. The plurality of lens elements may be grouped in a lens plate. However, also other types of optical elements may be additionally or alternatively present, such as reflectors, backlights, prisms, collimators, diffusors, louvers and the like. In the context of the invention, a lens element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface facing a LED, or more generally a lens portion with a flat or curved surface facing the LED, and optionally a collimator portion integrally formed with said lens portion, said collimator portion being configured for collimating light transmitted through said lens portion. Also, a lens element may be provided with a reflective portion or surface or with a diffusive portion. Further, so-called louver elements may be provided. Louver elements may be configured for cutting off or reflecting light rays having a large incident angle, thereby reducing the light intensities at large angles and improving the G/G* classification of the light module. Examples of louver elements are disclosed in PCT patent applications PCT/EP2020/066221 and PCT/EP2019/074894 and Dutch application N2025168 in the name of the applicant, which are included herein by reference. Further, a spacer layer may be disposed between the carrier and the one or more optical elements. The spacer layer is provided with one or more holes through which one or more light emitting element of the light source extend. Examples of spacer layers are disclosed in Dutch patent application N2025166 in the name of the applicant, which is included herein by reference.

According to a further developed embodiment, a light absorbing circumferential wall may be provided around the light source and extending downward from the support, in order to absorb a portion of the light emitted at large incident angles, preferably in order to absorb light emitted with an incident angle above a predetermined angle, said predetermined angle being in a range between 70° and 95°, more preferable between 70° and 85°. In other words, the light absorbing circumferential wall may have a height which is such that light with an incident angle above a predetermined angle is absorbed, said predetermined angle being in a range between 70° and 95°, more preferable between 70° and 85°. For example, the height may be between 1 and 5 cm, more preferably between 2 and 3 cm. The shape of the light absorbing circumferential wall may be a ring shape or a prism shape or any other suitable shape. The shape of the light absorbing circumferential wall may follow the shape of the protector but can also have a different shape. The light absorbing circumferential wall may extend over a small distance into the protector.

According to an exemplary embodiment, where the light source is arranged on one or more PCB's, a light absorbing circumferential wall may be provided around the one or more PCB's. For example, the one or more PCB's may be arranged on a mounting plate, preferably a light absorbing mounting plate, and the light absorbing circumferential wall may protrude downward around the one or more PCB's to absorb a portion of the light emitted at large incident angles. The one or more PCB's may have any shape. For example one rectangular or polygonal PCB may be provided. In a particular example the PCB may have the shape of a house (combination of a rectangle and a trapezoid). The shape of the light absorbing circumferential wall may be a ring shape or a prism shape or any other suitable shape. The shape of the light absorbing circumferential wall may follow the shape of the one or more PCB's but can also have a different shape.

It is noted that the principles of embodiments of the invention discussed above and below may be implemented in any kind of luminaires and lamp posts for which a reduction of the light pollution is desirable. More in particular the protector may have any shape and the light absorbing surface may be provided in any suitable way such that in use part of the light emitted from the light source is absorbed by the light absorbing surface to reduce upward light pollution. Also, the protector may comprise multiple wall portions e.g. arranged in a frame. For example, the principles of embodiments of the invention may be implemented in luminaires described in EP3537029A1, WO2020152294, PCT/EP2020/068886, PCT/EP2020/068889, in the name of the applicant, which are included herein by reference.

In an exemplary embodiment, the protector is rotation symmetrical around a central axis of the luminaire. In another exemplary embodiment the protector may approach the shape of a classical lantern, and may comprise multiple substantially flat portions.

In an exemplary embodiment two or more brackets may be provided between the support and the bottom. For example, two opposite brackets may be provided. In another example, four brackets may be provided, e.g. to resemble the shape of a lantern. Optionally, the brackets may surround the protector and/or form a frame for the protector.

According to a further aspect, a lamp post is provided comprising a luminaire assembly according to any one of the previous embodiments, and further comprising a support pole. In a possible embodiment with brackets as described above, the support pole is arranged below the protector, wherein the at least two brackets have a lower end connected to the support pole, optionally via connecting means.

According to a further aspect, a modular lamp post is provided comprising a plurality of pole modules arranged one above the other along a central axis, wherein said plurality of pole modules comprise a light module comprising a luminaire assembly according to any one of the embodiments above.

According to a preferred embodiment, the light module comprises a housing comprising a lower section, a middle section and an upper section, wherein the middle section comprises the protector. The support carrying the light source is arranged in an upper part of the housing, near said upper section. The lower section comprises a connection interface configured to connect the light pole module to a lower pole module of said plurality of pole modules or to the support pole. In such an embodiment, typically the protector has an open bottom.

According to a preferred embodiment, the middle section is a transparent or translucent section, preferably a cylindrical section but other shapes are possible as well.

According to a preferred embodiment, a second support carrying a second light source is provided, said second support being arranged at a distance of the support, in a middle part of the housing between the upper and lower section.

According to a preferred embodiment, at least two rods are provided for connecting the lower section to the upper section, wherein the at least two rods preferably have a light absorbing outer surface, e.g. a black outer surface. In this way the rods contribute to the reduction of the light pollution.

According to a preferred embodiment, the second support is fixed to the at least two rods.

According to a preferred embodiment, the light absorbing surface is provided in said housing, on or near the second support facing the first light source.

According to a preferred embodiment, a second light absorbing surface is provided in said housing on or near the lower section facing the second light source.

According to a preferred embodiment, at least one light absorbing ring or frame is provided in the protector, around the light source and/or around the second light source, wherein the ring is preferably arranged adjacent the peripheral wall of the protector. For example, the ring may be a cylindrical ring.

According to another aspect, a light pole module for use in a lamp post is provided. The lamp post comprises a plurality of pole modules arranged one above the other along a central axis of the lamp post. The light pole module comprises a housing comprising a lower section, a middle section and an upper section; a first support carrying a first light source and a second support carrying a second light source. The first support is arranged in an upper part of the housing, near said upper section. The second support is arranged at a distance of the first support in a middle part of the housing between the upper and lower section. The lower section comprises a connection interface configured to connect the light pole module to a lower pole module of said plurality of pole modules or to the lamp post. Such a light pole module with a first and a second light source arranged one above the other has the advantage that a large light output can be obtained using a compact structure.

In further developed embodiments, even more than two supports may be arranged in the light pole module, one above the other.

Preferably, the middle section is a transparent or translucent section, preferably a cylindrical section. In that manner, the first light source can emit light through an upper part of the middle section and the second light source can emit light through a lower part of the middle section.

Preferably, the light pole module comprises at least two rods connecting the lower section to the upper section. The at least two rods extend through the middle section. Preferably, the at least two rods extend at a distance of the central axis, parallel to the central axis. More preferably the at least two rods are distributed evenly around a perimeter adjacent the middle section. For example, when two rods are provided, they may be arranged diametrically opposite to one another. Although it is also possible to have one central rod, it is generally preferred to have at least two rods.

Preferably, the first and/or second support is fixed to the at least two rods. In that manner, the first and/or second support with the at least two rods can be mounted/removed easily in/out of the middle section.

Preferably, a light absorbing surface is provided in said housing, on or near the second support facing the first light source. This will allow reducing upward pollution. In a similar manner, a second light absorbing surface may be provided in said housing on or near the lower section facing the second light source, in order to further reduce upward light pollution.

Preferably, a light absorbing ring or frame is provided in said housing, around the first light source and/or around the second light source. This may help in reducing undesirable light emission through a first gap between the first support and the middle section and/or between a second gap between the second support and the middle section. For example, the light absorbing ring may be cylindrical. Alternatively or in addition, a light absorbing wall could be provided on a PCBs or support carrying the light source.

Other preferred embodiments may include features disclosed above for the first aspect.

According to another aspect, there is provided a modular lamp post comprising a plurality of pole modules arranged one above the other and including a light pole module according to any one of the embodiments above.

In a preferred embodiment, a pole module comprises an interface formed at an end thereof, said interface being configured for engaging with a complementary interface of an adjacent pole module. Further, an external or internal module connector may be provided for connecting the complementary interfaces. Preferably, the module connector has a surface shaped to be complementary to a shaped portion formed by the engaged complementary interfaces. Preferably, the module connector is configured to apply pressure in a first direction when the module connector is tightened against the engaged complementary interfaces. Preferably, the module connector is configured to convert the pressure applied in the first direction to a clamping pressure in a second direction, the second direction being substantially perpendicular to the first direction.

In a preferred embodiment, the lower section of the light pole module is provided with a lower round end portion, and is connected to one of a plurality of pole modules of the modular lamp post through a pole connector comprising a first round connector portion and a second round connector portion which together surround the round end portion of the lower section and an adjacent round end portion of said one pole module.

In other embodiments, other connection interfaces may be used, such as connection interfaces with polygonal connector portions.

More specifically, any adjacent pole module of the plurality of pole modules may be interconnected through a pole connector comprising a first round connector portion and a second round connector portion which together surround round end portions of the adjacent pole modules. If a support pole is present, the lowest pole module of the plurality of pole modules may be connected to the support pole through a pole connector comprising a first round connector portion and a second round connector portion which together surround a round end portion of the lowest pole module and an adjacent round end portion of the support pole. The pole connector may have an outer diameter which is substantially the same as an outer diameter of the support pole. The support pole and the middle section of the light pole module may have an outer diameter which is substantially the same.

In other embodiments, splint mechanisms or pivot mechanisms may be used to interconnect two adjacent modules in a rotatable manner. For example, a lower end portion may be provided with a central shaft portion which is configured to be rotatably received in an upper end portion of a lower pole module, or an upper end portion may be provided with a central shaft portion which is configured to be rotatably received in a lower end portion of an upper pole module.

According to an exemplary embodiment, the plurality of pole modules comprises any one or more of the following: one or more light pole modules comprising a light source, an antenna pole module, and more generally any functional pole module. Further, a driver for driving the plurality of light emitting diodes, optionally in combination with a dimmer may be integrated in the lamp post in any known manner Examples of functional components which may be included in a pole module or in a housing attached to an external surface of the lamp post, are any one or more of the following:

- power management circuitry, preferably power management circuitry configured to manage the provision of power to multiple lamp posts, preferably at least three lamp posts, e.g. more than ten lamp posts. In such embodiments power connection cables pass from the pole module through the support pole to other lamp posts, e.g. underground;
- telecommunication circuitry, such as base station circuitry;
- audio system management circuitry;
- a display;
- an antenna;
- WiFi circuitry, wherein an antenna for receiving WiFi signals may be integrated either in the pole module or in a separate antenna module;
- charger circuitry, e.g. phone charger circuitry or vehicle charger circuitry;
- an environmental sensor such as a microphone, or a detector of $CO_2$, $NO_x$, smoke, etc., and the associated circuitry;
- an optical sensor such as a photodetector or an image sensor, a sound sensor, a LIDAR, a humidity sensor, a pollution sensor, a temperature sensor, a motion sensor, an RF sensor, a vibration sensor, a metering device, a malfunctioning sensor, a measurement device for measuring a maintenance related parameter of a component of the module, an alarm device;
- a human interface device (HID) and the associated circuitry, e.g. a camera, a loudspeaker, a button, a touch screen, etc.
- repeater circuitry, e.g. a WiFi repeater;
- a radar sensor, such as a Doppler effect radar;
- a sign, such as a publicity banner;
- a water discharge device, such as a shower head, a sprinkler, a water sprayer, etc;
- a trash bin;
- a socket, such as an electrical socket.

According to another aspect there is provided a luminaire assembly for outdoor luminaires. The luminaire assembly comprises a light source, a support for carrying the light source and a protector. The protector is protecting the light source from external environmental influences, and has an open top for accommodating the support, a bottom facing said light source and a peripheral wall between the open top and the bottom. The peripheral wall comprises a transparent or translucent portion, and the light source is configured to send light in use through said portion of the peripheral wall. Further the luminaire assembly comprises a light absorbing circumferential wall around the light source and extending downward from the support, in order to absorb a portion of the light emitted at an incident angle above a predetermined angle, said predetermined angle being in a range between 70° and 95°, more preferable between 70° and 85°. In other words, the light absorbing circumferential wall may have a height which is such that light with an incident angle above the predetermined angle is absorbed.

For example, the height may be between 1 and 5 cm, more preferably between 2 and 3 cm.

The shape of the light absorbing circumferential wall may be a ring shape or a prism shape or any other suitable shape. The shape of the light absorbing circumferential wall may follow the shape of the protector but can also have a different shape. The light absorbing circumferential wall may extend over a small distance into the protector.

According to a preferred embodiment, the light absorbing circumferential wall may have an inner surface made of or covered with a material configured to absorb more than 80% of visible light that is emitted on the surface thereof, preferably more than 85%, more preferably more than 95%.

According to an exemplary embodiment, where the light source is arranged on one or more PCB's, a light absorbing circumferential wall may be provided around the one or more PCB's. For example, the one or more PCB's may be arranged on a mounting plate, preferably a light absorbing mounting plate, and the light absorbing circumferential wall may protrude downward around the one or more PCB's to absorb a portion of the light emitted at large incident angles. The one or more PCB's may have any shape.

BRIEF DESCRIPTION OF THE FIGURES

This and other aspects of the present invention will now be described in more detail, with reference to the appended drawings showing currently preferred embodiments of the invention. Like numbers refer to like features throughout the drawings.

DESCRIPTION OF EMBODIMENTS

Figure 1:
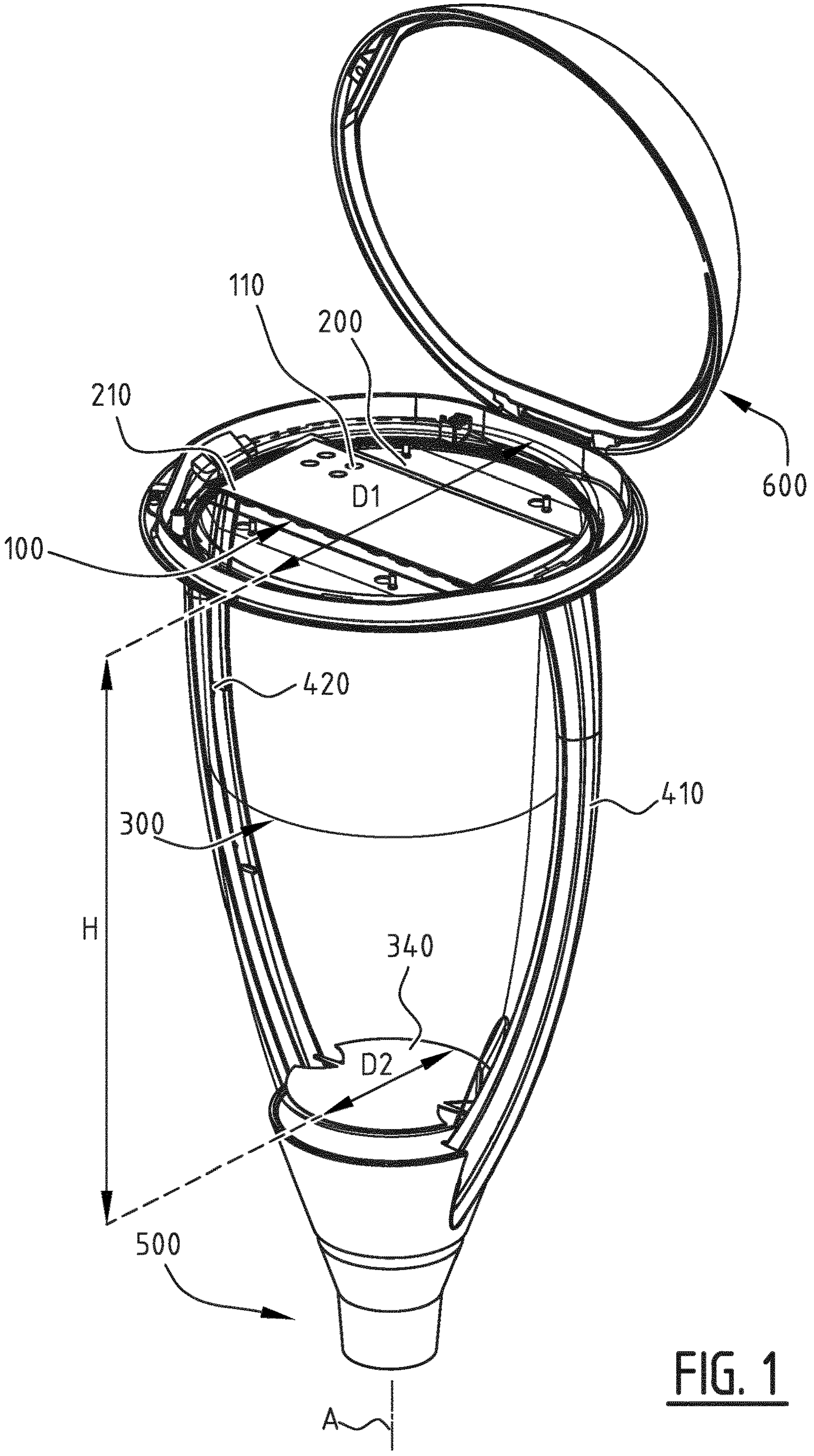
FIG. 1 illustrates a see-through perspective side view of an exemplary embodiment of a complete luminaire head assembly in a post-top configuration.

The luminaire head assembly of FIG. 1 may be included in a luminaire comprising said luminaire assembly 1 and a luminaire pole. The luminaire assembly may be connected to the luminaire pole in any manner known to the skilled person. Typical examples are street lights. In other embodiments, the luminaire head assembly 1 may be connected to a wall or a surface, e.g. for illuminating buildings.

Figure 2:
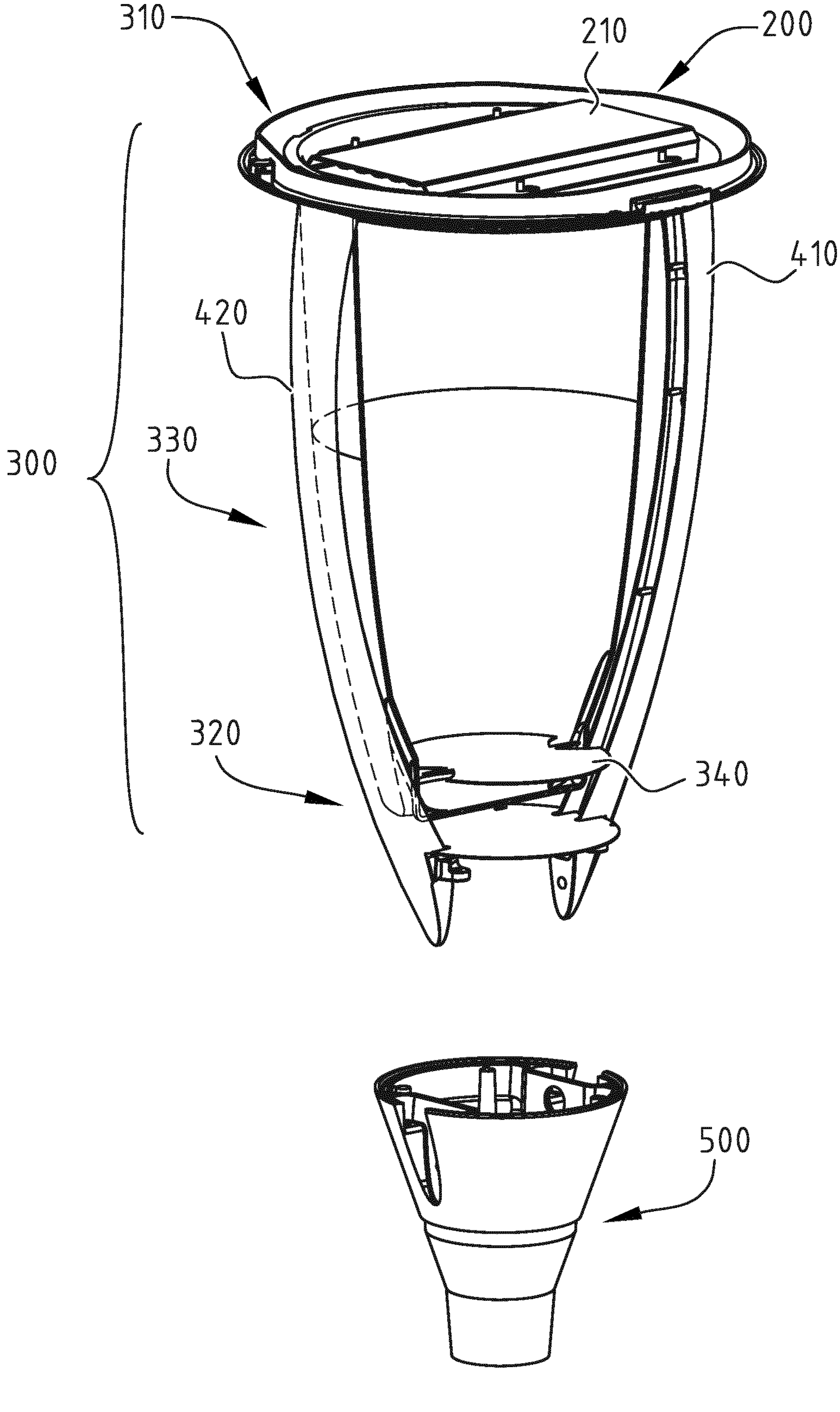
FIG. 2 illustrates an exploded and partially schematic view of the embodiment of FIG. 1.
Figure 3:
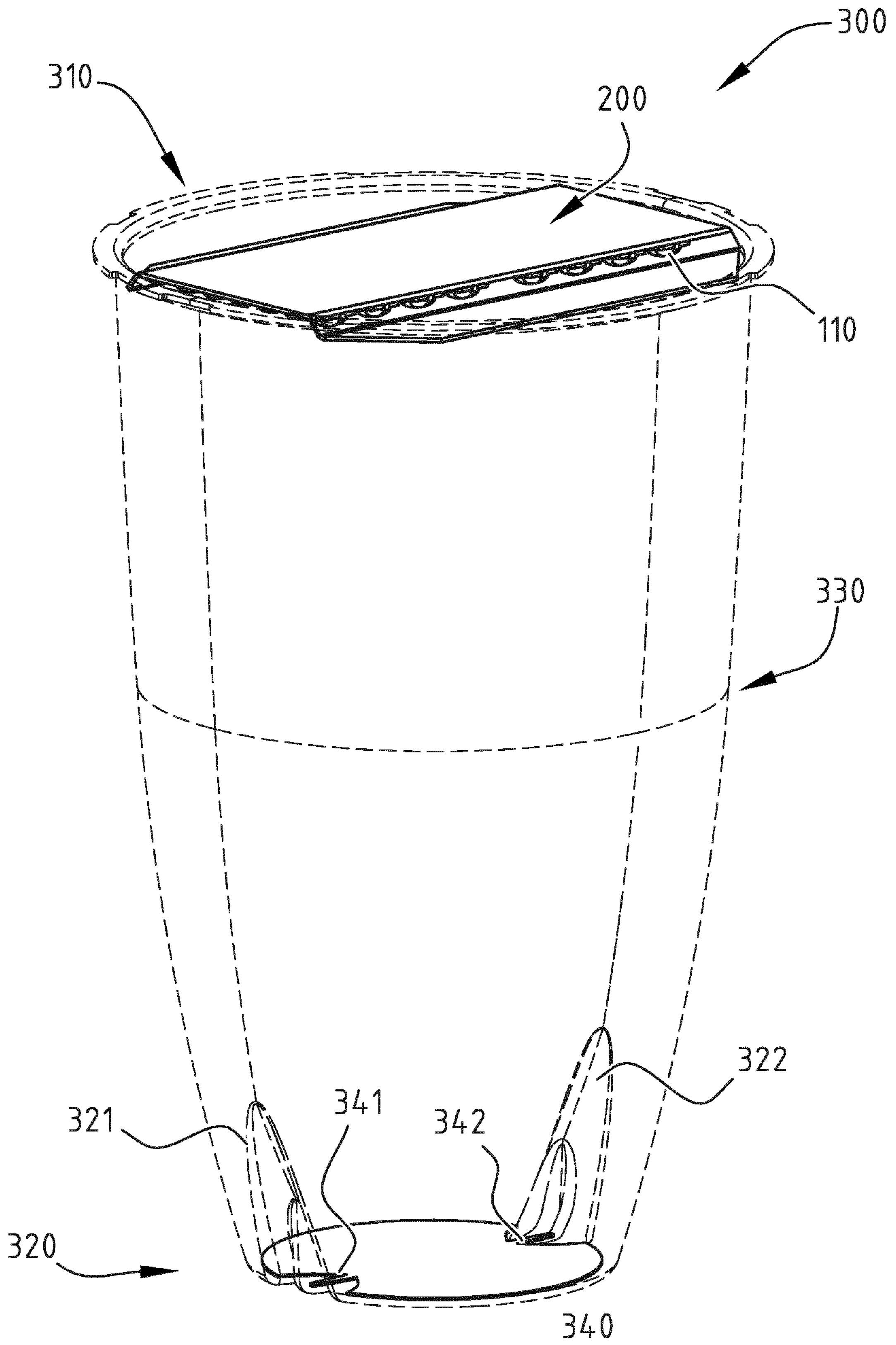
FIG. 3 illustrates a schematic view of a protector according to the embodiment of FIG. 1.

FIGS. 1 to 3 illustrate an embodiment of a complete luminaire head assembly in a post-top configuration, where a luminaire head assembly is installed on a luminaire pole.

The luminaire assembly 1 comprises a light source 100. The light source 100 comprises a plurality of LEDs. Optionally, one or more optical elements, such as lenses and/or reflectors, may be arranged over the plurality of LEDs. The optical elements may be integrated in a plate comprising a plurality of optical elements, e.g. a lens plate. Typically, the light source comprises at least 4 LEDs, at least 8 LEDs, preferably at least 16 LEDs.

The luminaire assembly further comprises a support 200 for carrying the light source 100. The support 200 comprises one or more PCB's 210 and the LEDs 110 are arranged on a lower side of the one or more PCB's 210. Optionally the support 200 may further comprise a heat sink (not illustrated).

The luminaire assembly further comprises a protector 300 serving as cover for the light source 100 against external influences like dirt and rain. The protector 300 is protruding away from the light sources and has an open top 310 for accommodating the light source 100 carried on the support 200, a closed bottom 320, and a peripheral wall 330, see FIG. 3. The peripheral wall 330 comprises a transparent or translucent portion letting the light of the light source through and the light source 100 is configured to send light in use through said portion of the peripheral wall 330. Preferably, the protector has an axial direction extending in a direction of the pole, and the protector has a height H measured along the axial direction A.

As is best visible in FIG. 3, the protector 300 has a peripheral wall having a substantially conical shape with the open top 310 of the protector being larger than a surface area of the closed bottom 320 of the protector, preferably at least 10% larger, more preferably at least 50% larger. The height H of the peripheral wall 330 of the protector 300 is at least 25 cm, preferably at least 30 cm, more preferably at least 40 cm. Typically, the top diameter D1 is between 20 cm and 40 cm, the bottom diameter D2 is between 10 cm and 30 cm and the height H of the protector is between 40 cm and 70 cm.

It is noted that the taper angle of the protector has an influence on the amount of light reflected towards the bottom 320 such that a substantially conical protector represents the situation where the invention is especially advantageous. Alternatively the shape of the protector may be substantially of a cylindrical shape, a stepped shape, a conical shape or a combination thereof.

Preferably, the peripheral wall 330 and the closed bottom 320 are formed as one integral protector casing, e.g. a transparent or translucent plastic casing.

Preferably the protector may be releasably attached to the support 200 and/or to further connection parts by means of any one or more of the following elements: screws, locks, clamps, clips.

The configuration illustrated in FIGS. 1, 2 and 3 corresponds to a post-top configuration arrangement, where a luminaire head is mounted on top of a pole. In that configuration, the luminaire assembly may further comprise brackets 410 and 420 extending between the support 200 and the closed bottom 320 end, along an outer surface of the peripheral wall 330. The brackets 410 and 420 may be arranged for carrying the protector and may be located symmetrically with respect to the axial direction of the protector. The two brackets 410, 420 may have a lower end connected to the support pole P via intermediate connecting means 500, serving as a supporting base.

Alternatively the luminaire head may be arranged in side-entry configuration where a support pole is arranged adjacent the protector 300 and the support 200 or the upper cover 600 is connected to the support pole via a side arm. For example, a side arm or bracket may connect the upper cover 600 to a support pole. Alternatively, the bottom of the protector 300 may be connected with a side arm or bracket to the support pole.

The luminaire assembly of FIG. 1 shows further an upper cover 600 in open position. When in closed position, the cover 600 protects the upper side of the support 200 against external influences like rain and dirt. The cover 600 operates also as a hat absorbing upward light coming from the light source and reflected by the protector 300. The cover 600 may be provided with an outwardly protruding portion as illustrated in FIG. 1 and is releasably attached to the support 200 and/or to further connection parts. Preferably the dimensions of the cover 600 are bigger than the ones of the open top 310 to protect further against upwards light pollution.

In FIG. 2 an exploded schematic view of the luminaire assembly of FIG. 1 is shown. As illustrated the protector has an open top 310 and a closed bottom 320 facing the light source 100. A support 200 is provided to carry the light source. A peripheral wall 330 extends between the open top 310 and the closed bottom 320. A light absorbing surface 340 is located inside the protector 300 and at the bottom 320 of the protector and configured such that in use part of the light from the light source 100 is absorbed by the light absorbing surface 340 to reduce light pollution. The light absorbing surface 340 is part of a separate element introduced inside the protector 300 from the open top 310 and prior to the mounting of the support 200 at the open top of the protector 300. The separate element 340 may be positioned against or at a small distance of the inner surface of the bottom 320 of the protector 300.

Typically the light source 100 is configured to send light in use through the peripheral wall 330 downwards towards the ground, e.g. a street or a pavement, and the light absorbing surface 340 is configured such that in use part of the light from the light source 100 is absorbed at the bottom 320 of the protector to reduce light reflected upwards.

The light absorbing element has a light absorbing surface 340 facing the light source and is made of a material configured to absorb more than 80% of visible light that is emitted on the surface thereof, preferably more than 95%. Typically the light absorbing element comprises a black layer, preferably a matt black layer. Alternatively other colours with suitable light absorbing properties may be used as long as more than 80% of the light beams reaching the light absorbing surface are absorbed.

FIG. 3 illustrates a schematic view of a protector according to an embodiment of the present invention. As illustrated in FIG. 3, the light absorbing surface 340 is part of a separate element located in an inner area delimited by the peripheral wall 330 of the protector 300 on or near the closed bottom 320. Preferably the light absorbing surface 340 is located at less than 5% of the height of the protector from the bottom 320, more preferably directly on the bottom. Typically the separate light absorbing surface is directly in contact with the inner bottom surface of the bottom 320. Alternatively the separate light absorbing element may be located at a distance from the bottom 320, using for instance legs and/or anchoring means on the peripheral wall. The light absorbing surface 340 of the light absorbing element is located inside the protector such that light beams coming directly or indirectly from the light source are absorbed and are not reflected on a lower surface of the protector.

The bottom 320 of the protector illustrated in FIG. 3 is flat with a substantially disk shape. This configuration represents a situation where the invention is especially advantageous. Indeed second order reflections are particularly creating upward light emissions in case of profound protectors with a flat bottom facing the source. Alternatively the bottom surface can have a curved shape or a free-form shape which would create second order reflections of light upwards if no light absorbing surface were to be present.

The light absorbing surface 340 as illustrated in FIG. 3 extends over the whole inside flat bottom 320 of the protector. Alternatively the light absorbing surface 340 may extends over at least 90% of an inside bottom surface of the protector, in particular to cover a portion of the bottom surface where upwards reflections occur the most, for instance an outer ring of the inner bottom surface of the bottom 320.

The light absorbing element comprising the light absorbing surface may be mounted tight inside the protector bottom or adhered to it by glue or any other known means. In the case of a plastic protector, a light absorbing element made of metal or plastic may be used in combination with a tight mechanical mounting. Preferably the rigidity of the material of the light absorbing element is higher than the one of the protector. More generally other materials for the protector and the light absorbing element may be chosen taking into account the difference in rigidity between them providing benefits for a tight mounting.

As illustrated the bottom of the protector 320 is provided with at least two recesses 321, 322 for housing a portion of the at least two brackets 410, 420 and the separate element forming the light absorbing surface 340 is shaped with at least two recesses 341,342 corresponding with the at least two recesses 321, 322 of the bottom 320. In the illustrated embodiment, the recesses 321, 322 are "double bulged", but this is merely an example. Other shapes of recesses for mounting purposes may be considered, and more generally the shape of the light absorbing surface may be adapted to the shape of the protector in which it is fitted in, such that a tight fit is realised.

In addition, although represented here as having a closed bottom, other luminaires according to the invention may have a protector with an open bottom, or with a bottom comprising apertures for electrical and/or electronic and/or mechanical connections. The apertures may be provided for wires.

Some luminaires may by construction comprise at least one hollow rod extending inside the protector between the support and the bottom. In that case preferably the light absorbing surface is shaped with at least a recess for the at least one hollow rod. The hollow rods may serve as guide for electrical and/or electronic and/or mechanical connections going through the protector towards the light source or its support. Additionally, the light absorbing surface may preferably be located at a distance from the bottom of the protector, by resting on legs or by anchoring on the peripheral wall to cover the connections and avoid light reflections in all directions due to the incidence of the light on the electrical and/or electronic and/or mechanical connections.

Optionally, a light absorbing circumferential wall (not shown) may be provided around the light source and extending downward from the support 200, in order to absorb a portion of the light emitted at large incident angles. The light absorbing circumferential wall may extend over a small distance into the protector 300. The light absorbing circumferential wall may be provided around the one or more PCB's 210. For example, the one or more PCB's 210 may be arranged on a mounting plate, preferably a light absorbing mounting plate, and the light absorbing circumferential wall may protrude downward around the one or more PCB's 210 to absorb a portion of the light emitted at large incident angles. The one or more PCB's 210 may have any shape. For example one rectangular or polygonal PCB 210 may be provided. In a particular example the PCB 210 may have the shape of a house (combination of a rectangle and a trapezoid), and the light absorbing circumferential wall may then also have the shape of a house.

Figure 4:
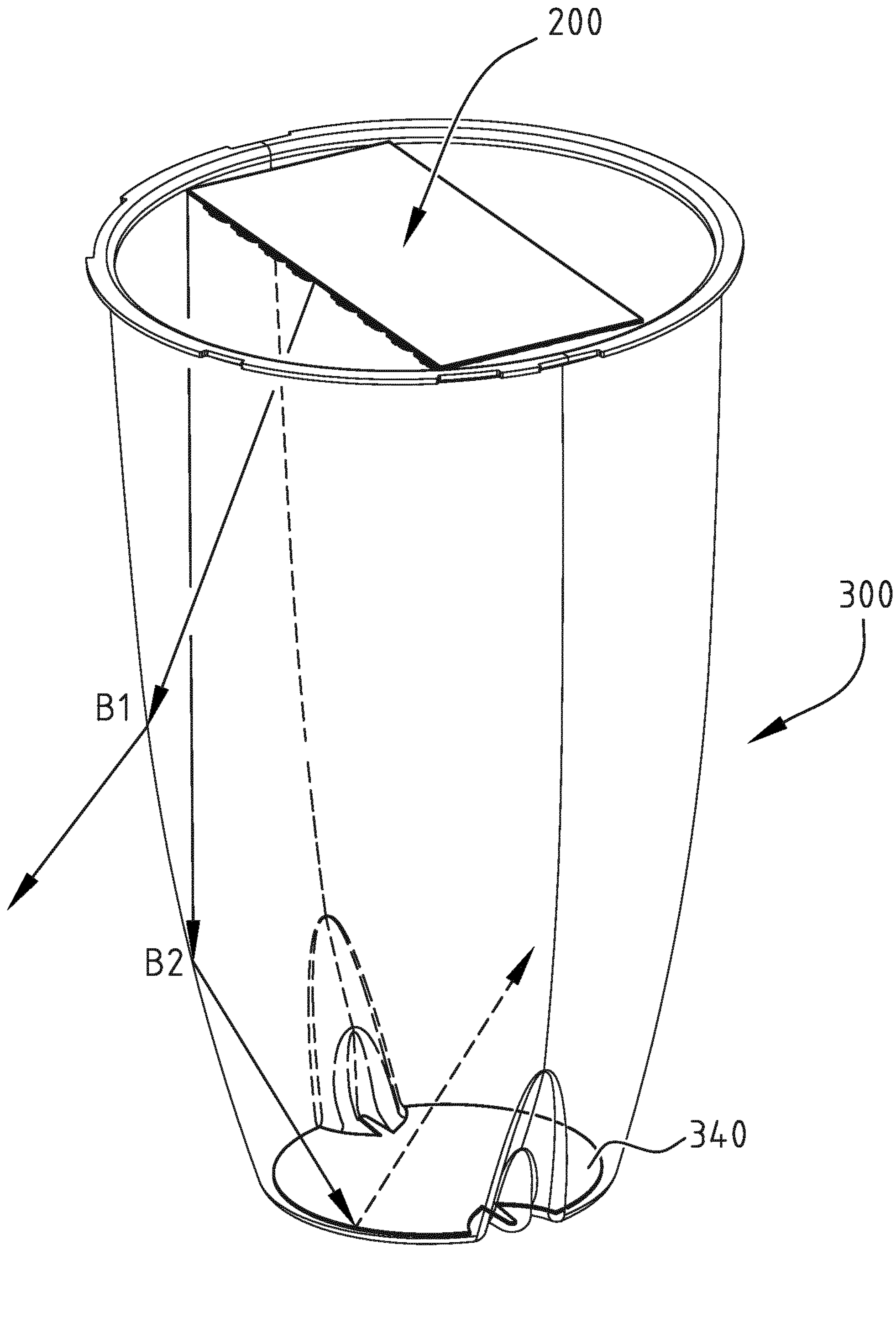
FIG. 4 illustrates a perspective front view with a schematic representation of different light beams for a protector according to the embodiment of FIG. 2.

FIG. 4 illustrates a perspective front view with a schematic representation of different light beams in a protector according to an embodiment. As illustrated in FIG. 4, a first beam B1 of light with a high incidence angle on the peripheral wall is refracted to the exterior of the protector. A second beam of light B2 with a low incidence angle on the peripheral wall is reflected by the wall towards the bottom surface of the protector and absorbed by the light absorbing surface 340. Without the light absorbing surface 340, a reflection on the bottom surface of the protector would create a second order upward light emission inside the protector 300 represented by a crossed hatched arrow, which could further travel upward and out of the protector after refraction on the protector. Multiple reflections on the wall prior to reaching the bottom surface may also occur.

For incidence angles greater than the taper angle of the cone, it has been identified that beams are not reflected upwards. On the contrary for incidence angles smaller than the taper angle of the cone, the light absorbing surface plays an important role and allows reducing significantly second and higher order reflections and more generally upward light pollution. In particular for street lighting any light emitted above the horizontal plane of the support 200 is subjected to strict regulations and norms. Preferably the proportion of light emitted upwards versus light emitted downwards should be less than 1%.

Figure 5:
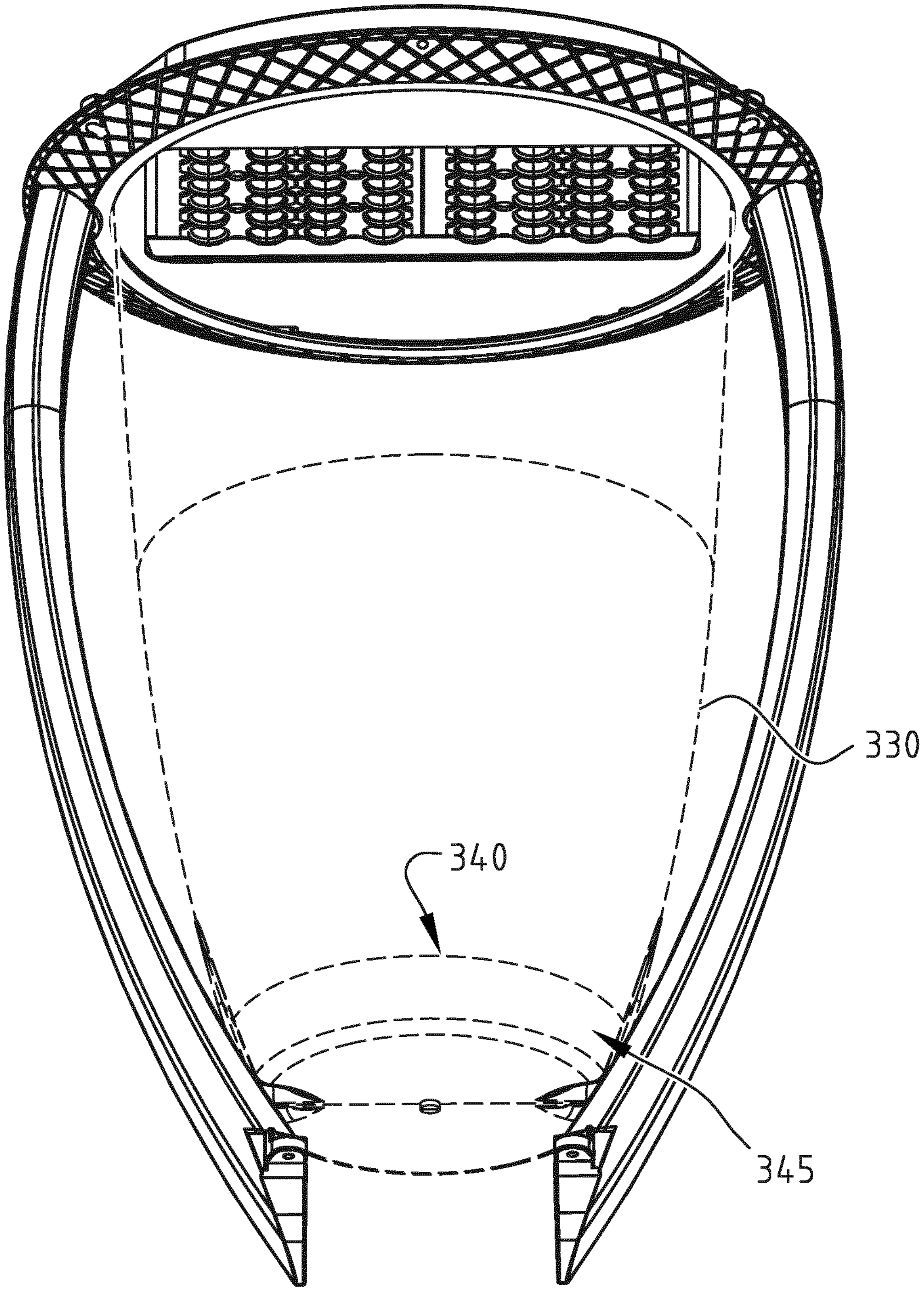
FIG. 5 illustrates a perspective bottom view of the protector according to another embodiment.

FIG. 5 illustrates a perspective bottom view of the protector according to another embodiment. According to a second embodiment, the light absorbing surface 340 facing the light source and inside the protector is provided with a peripheral collar 345 extending adjacent the peripheral wall 330 of the protector 300. The collar 345 enables absorbing further possible upward reflections at the bottom of the protector. The light absorbing surface 340 is located on the inside of the protector and may be a separate element with substantially the shape of a plate resting on the inside bottom surface of the protector. The collar 345 may be an integral part of the separate light absorbing element. Alternatively, the plate-like absorbing surface may be fixed at a certain distance above the bottom surface, by resting on legs or by anchoring on the peripheral wall.

Figure 6:
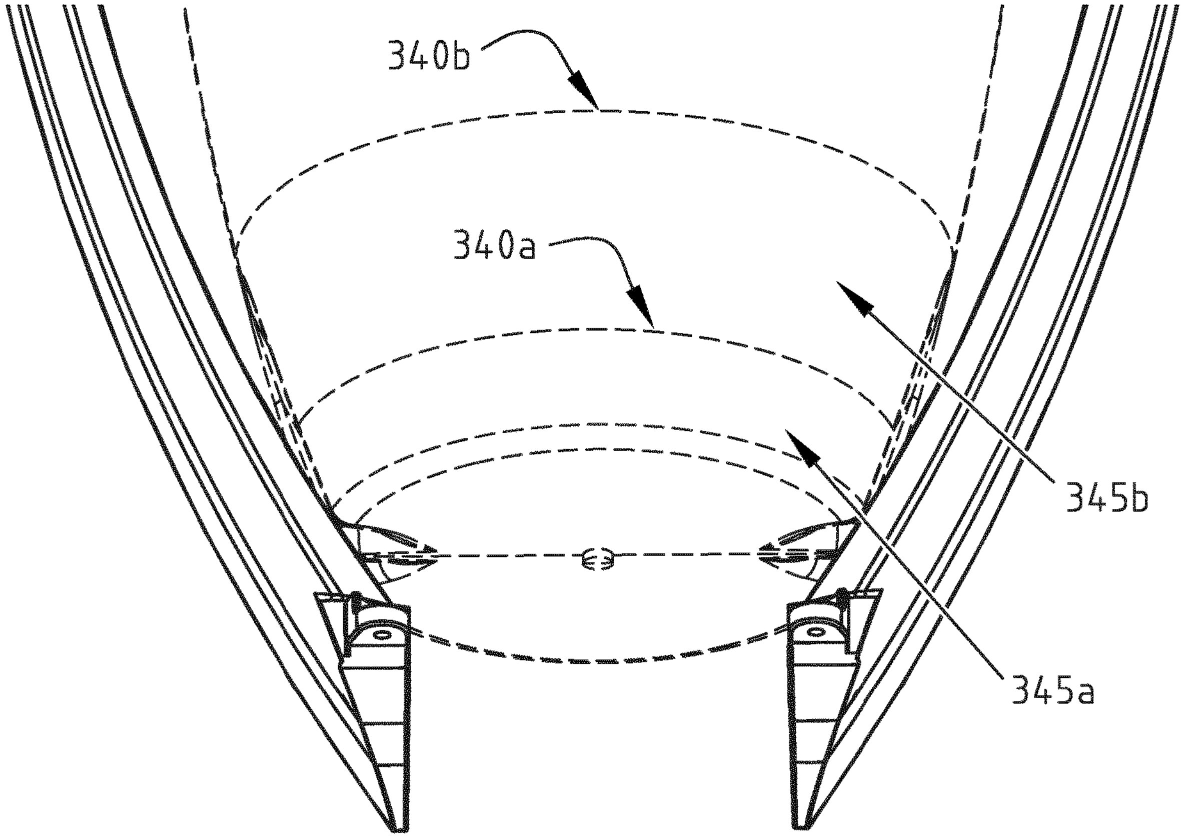
FIG. 6 illustrates an enlarged perspective bottom view of the protector according to the embodiment of FIG. 5 with two different heights of collars.

FIG. 6 illustrates an enlarged perspective bottom view of the protector according to the second embodiment with two different heights of collars. The light absorbing element 340*a* inside the protector has a collar 345*a* with a smaller height than another absorbing element 340*b* having a collar 345*b* with a higher height. The light absorbing element 340*b* absorbs more light than the light absorbing element 340*a*. In this manner, not only the reflections on the bottom surface but also upwards reflections on the lower part of the peripheral wall can be absorbed. The height of the collar can be determined based on trade-off considerations between the amount of upwards light absorbed and the amount of downwards light transmitted. Preferably the height of the collar is less than 10% of the height of the protector, more preferably less than 5% of the height of the protector, more preferably less than 1% of the height of the protector. Typically the height of the collar is less than 5 cm, more preferably less than 1 cm or 2 cm.

Figure 7B:
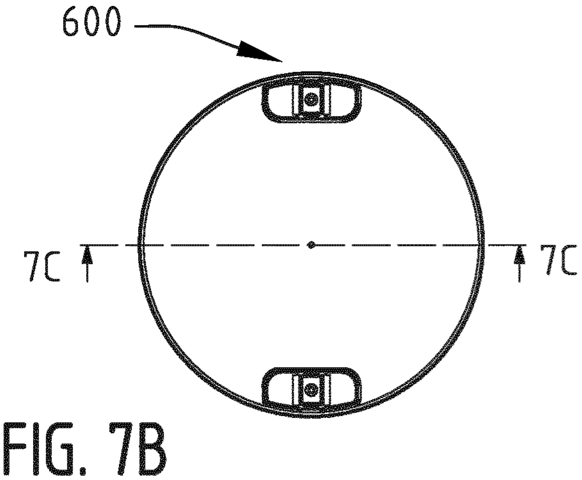
FIG. 7B illustrates schematically a top view of the cap of the luminaire assembly of FIG. 7A.
Figure 7C:
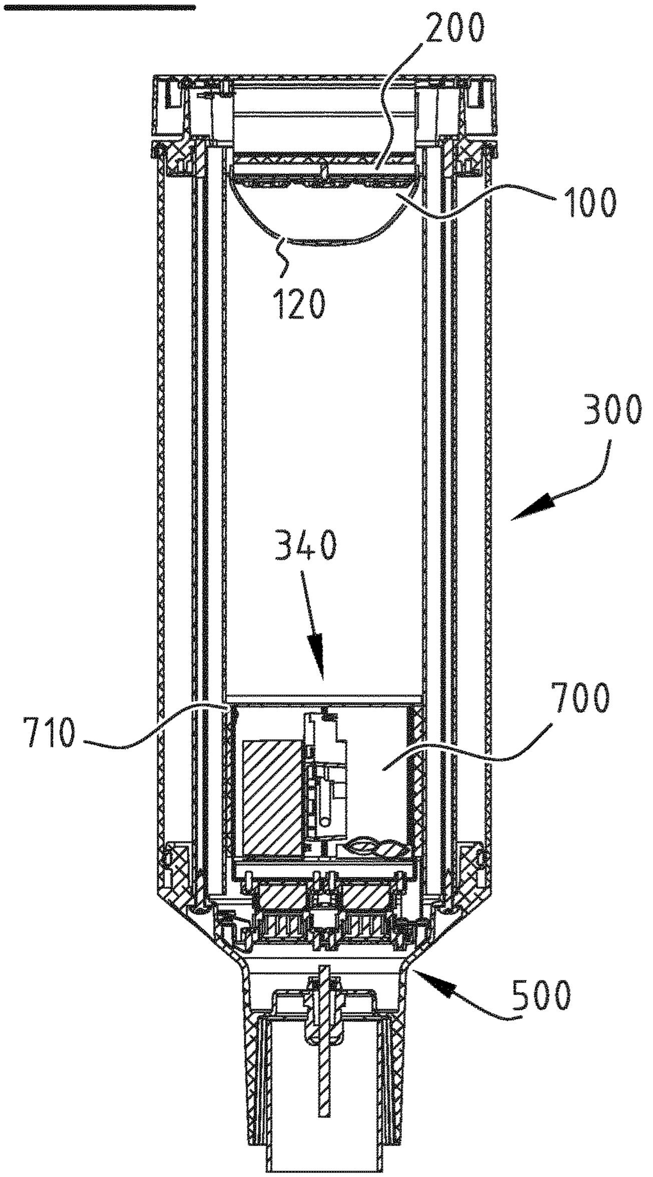
FIG. 7C illustrates schematically a section of the luminaire assembly of FIG. 7A, taken along line 7C-7C in FIG. 7B.
Figure 7A:
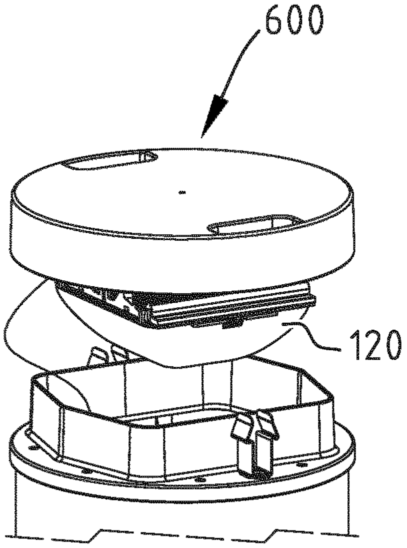
FIG. 7A illustrates schematically an exploded perspective view of a top portion of another embodiment of a luminaire assembly.

FIGS. 7A-7C illustrate another luminaire assembly according to the invention. The luminaire assembly of FIGS. 7A-7C comprises a base module 500, an at least partially transparent or translucent protector casing 300 of an essentially cylindrical shape, an electronic gear unit 700, a removable top cover 600, a support 200 for carrying the light source 100 comprising a plurality of light sources, and optionally a diffuser 120 for diffusing the light emitted by the light source 100, the diffuser being located in the vicinity of the light source 100 inside the protector 300. This type of luminaire assembly is disclosed in more details in EP 19 160 588.0 which is incorporated hereby by reference. The base module 500 is fixed to the support pole P, e.g. using a plurality of screws. The protector casing 300 has an open top and an open bottom, and extends upwardly from the base module 500 to the top cover 600. The protector casing 300 and the base module 500 are designed such that the electronic gear unit 700 is removable from the base module 500 through the protector casing 300. The cover 600 closes the open top 310 of the protector casing 300.

The electronic gear unit 700 is arranged in or on the base module 500 and comprises one or more electronic components, such as a LED driver, a controller, a surge protection device such as a varistor, a connector for wiring, a dimmer (not shown), etc. Typically at least the LED driver will be present in the electronic gear unit 700. The other components are optional and depend on the desired functionalities of the luminaire. It is noted that this is merely an example of a number of electronic components that may be arranged in the electronic gear unit 700. In other embodiments more or less electronic components may be present, and the components may be different depending on the desired functionalities.

The support 200 with the plurality of light sources 110 is arranged to emit light through the protector casing 300 and is connected to one or more electronic components of the electronic gear unit 700. The electronic gear unit 700 comprises a frame having a bottom, two uprights and an upper cover with a surface 710. The bottom of the frame carries the electronic and other components.

The absorbing surface 340 may be provided on top of the electronic gear unit 700, above the upper cover surface 710 as a separate element or integrated into the upper cover surface 710 itself, such that part of the light from the light sources 110 directed to the electronic gear unit 700 is absorbed and not reflected upwards. Where possible, this embodiment may be combined with previous embodiments.

Figure 8:
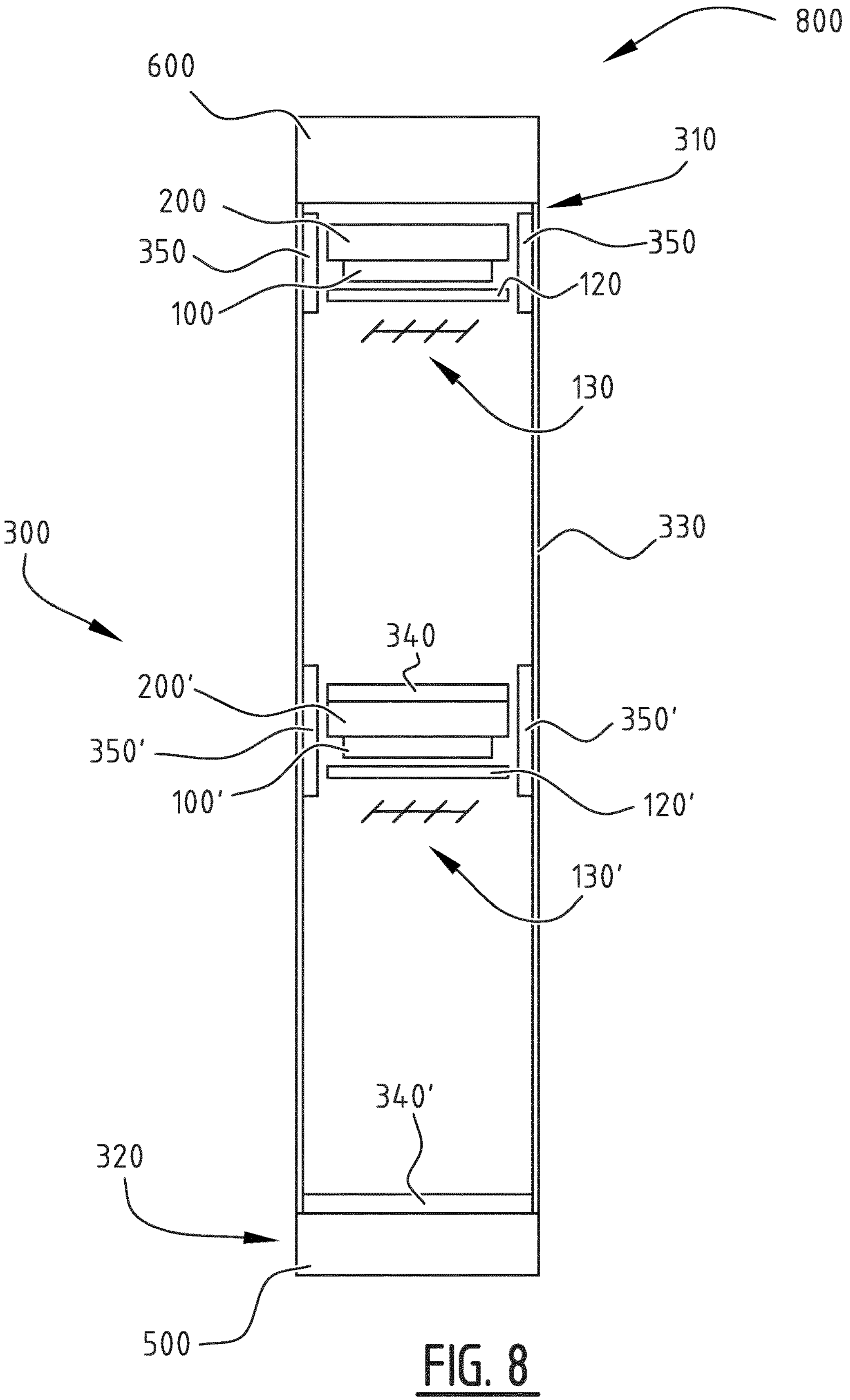
FIG. 8 illustrates schematically a section of an embodiment of a light pole module.
Figure 9:
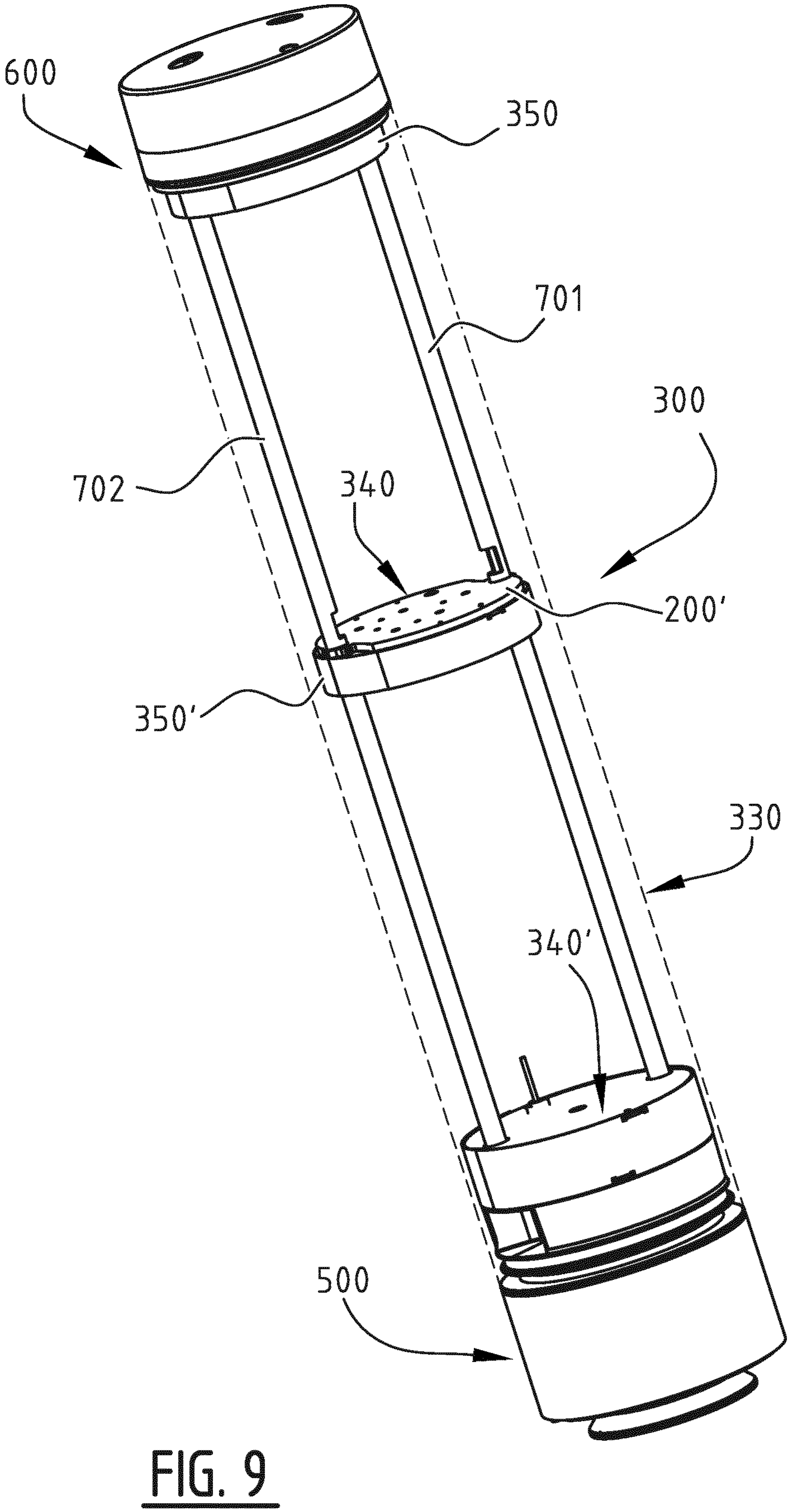
FIG. 9 illustrates a perspective view of an embodiment of a light pole module with two light sources.
Figure 10:
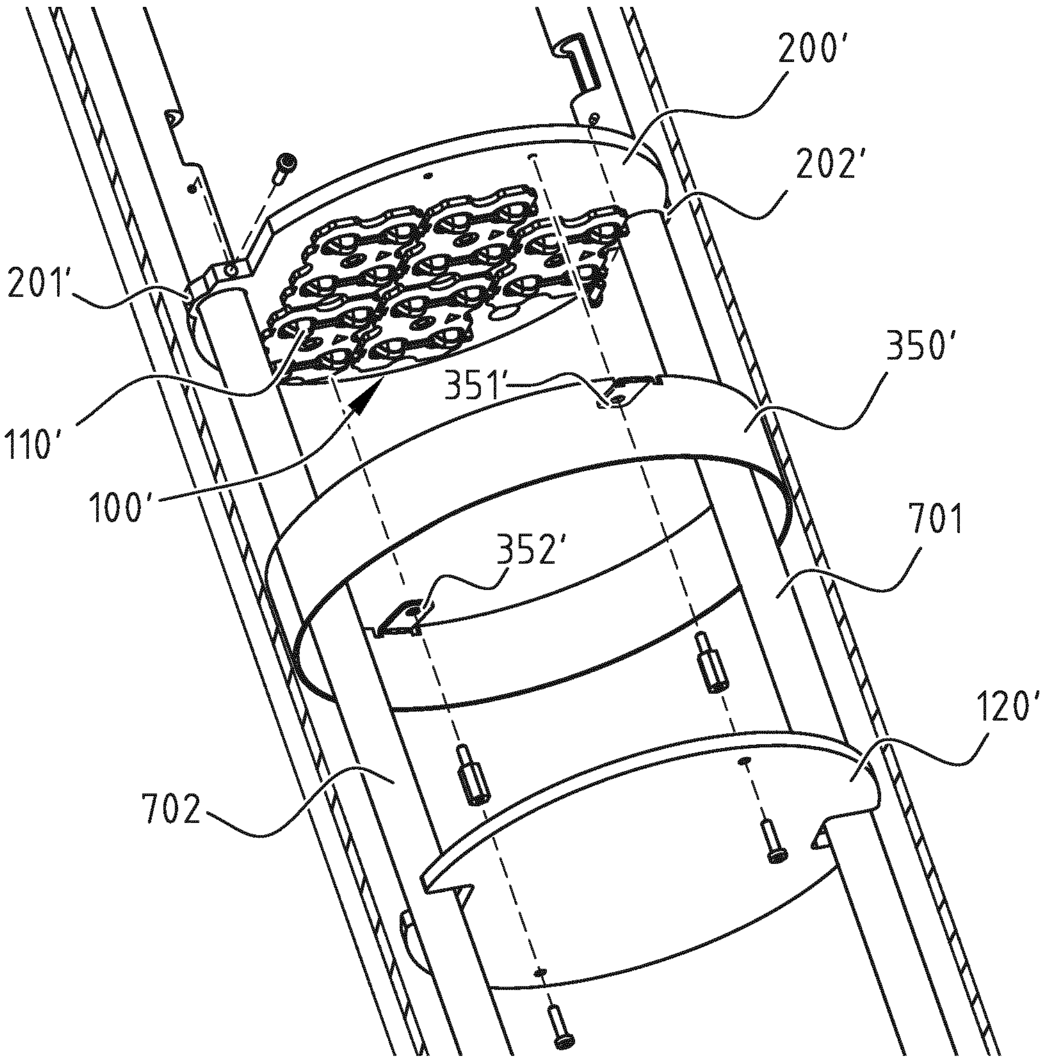
FIG. 10 illustrates an exploded view of a portion of FIG. 9.

FIGS. 8, 9 and 10 illustrate embodiments of a light pole module for use in a modular lamp post. WO2019/092273A1, which is incorporated herewith by reference, discloses an example of a modular lamp post in which the light pole module of FIGS. 8, 9 and 10 may be used. FIG. 8 illustrates a light module 800 comprising a first light source 100, a first support 200 for carrying the first light source 100, a protector 300 for protecting the first light source 100 from external environmental influences. The protector 300 has an open top 310 for accommodating the first support 200, an open bottom 320 facing the first light source 100 and a peripheral wall or middle section 330 between the open top 310 and the open bottom 320. The peripheral wall 330 comprises a transparent or translucent section, and the first light source 100 is configured to send light in use through a portion of the peripheral wall 330. In the illustrated embodiment, the peripheral wall 330 forms the protector which is made of a transparent or translucent material. The protector 300 is provided with a first light absorbing surface 340 arranged inside of the protector and facing the first light source 100. The light absorbing surface 340 is configured such that in use part of the light from the first light source 100 is absorbed by the first light absorbing surface 340 to reduce upward light pollution. In FIG. 8, the first light absorbing surface 340 is arranged in a middle part of the protector 300.

The light pole module of FIGS. 8, 9 and 10 may be part of a modular lamp post comprising a plurality of pole modules arranged one above the other along a central axis. The light pole module comprises a housing comprising a lower section 500, a middle section 330 and an upper section 600, wherein the middle section 330 constitutes the protector 300. The first support 100 carrying the first light source 200 is arranged in an upper part of the housing, near or against said upper section 600. A second support 200' carrying a second light source 100' is arranged at a distance of the first support 200 in a middle part of the housing between the upper and lower section 600, 500. It is noted that in other non-illustrated embodiments the second support 200' may be omitted.

The lower section 500 comprises a connection interface configured to connect the light pole module to a lower pole module of said plurality of pole modules and may extend partially inside the protector 300. The middle section 300 is a transparent or translucent cylindrical section. Similarly, the upper section 600 may comprise a connection interface configured to connect the light pole module to a higher pole module of said plurality of pole modules and may extend partially inside the protector 300. Alternatively, the upper section 600 may comprise a top cover to close the light pole module (if no other module is added on top of it).

As illustrated in FIGS. 9 and 10, at least two rods 701 and 702 may be present in the inner area delimited by the protector 300. The rods 701, 702 may be arranged adjacent the middle section 330, and may be arranged diametrically opposite to each other, parallel to the vertical axis. If more than two rods are present, they may be distributed evenly around the perimeter of the middle section. These rods 701 and 702 may be hollow and are for connecting the lower section 500 to the upper section 600 and/or for hosting or guiding a connection line, e.g. a supply line for feeding the light source. The connection line may comprise an electrical and/or electronic and/or optical connector. The rods may have openings in their middle part to enable wiring the connection line to the second light source 100'. The rods 701 and 702 may have a black outer surface to further contribute to reducing light pollution. The first and/or the second support 200 and 200' may be fixed to the at least two rods 701 and 702. In particular the second support 200' may comprise apertures 201', 202' such that the rods 701 and 702 may be inserted in said apertures 201' and 202' and such that the second support 200' may be slid along the rods 701 and 702 and fixed into place to the rods 701 and 702 using appropriate connecting means, like for example screws. The first support 200 may be fixed to the at least two rods 701 and 702 in a similar manner.

The light module may further comprise for the first and/or second light source 100, 100' inside the protector 300 and in the vicinity of the respective light source 100, 100', one or more optical elements, such as a diffuser 120, 120' for diffusing the light emitted by the respective light source 100, 100', and/or so-called Louver elements 130, 130' and/or backlight elements for directing the light. The diffuser 120, 120' may have recesses for housing the rods 701 and 702, such that the diffuser 120, 120' may be slid into place. Louver elements may comprise a light shielding structure configured for cutting off or reflecting light rays having a large incident angle, thereby reducing the light intensities at large angles and improving the G/G* classification of the light module. Examples of louver elements are disclosed in PCT patent applications PCT/EP2020/066221 and PCT/EP2019/074894 and Dutch application N2025168 in the name of the applicant, which are included herein by reference. Further, a spacer layer may be disposed between the carrier and the one or more optical elements. The spacer layer is provided with one or more holes through which one or more light emitting element of the light source extend. Examples of spacer layers are disclosed in Dutch patent application N2025166 in the name of the applicant, which is included herein by reference.

The first light absorbing surface 340 may be provided in said housing, on or near the second support 200' facing the first light source 100. The first light absorbing surface 340 is provided on top of the second support 200', such that part of the light from the first light source 100 carried by the first support 200 and directed to the top surface of the second support 200' is absorbed and not reflected upwards. The upper half of the protector 300 defines the inner area where the light absorbing surface 340 serves the purpose of reducing upward light pollution. Light beams from the first light source 100 directly or indirectly reaching said first light absorbing surface 340 will be substantially absorbed reducing or avoiding upward reflection.

A second light absorbing surface 340' may be provided in said housing on or near the lower section 500 facing the second light source 100'. The lower half of the protector 300 defines the inner area where the second light absorbing surface 340' serves the purpose of reducing upward light pollution. Light beams from the second light source 100' directly or indirectly reaching the second light absorbing surface 340' will be substantially absorbed reducing or avoiding upward reflection.

It is noted that in other non-illustrated embodiments, the second light source 100', the second support 200' and the second light absorbing surface 340' may be omitted, and the first light absorbing surface 340 may then be arranged on or near the lower section 500.

Additionally, a light absorbing circumferential wall shaped as a cylindrical light absorbing ring 350 and/or 350' may be provided in said housing, around the first light source 100 and/or around the second light source 100'. In other embodiments, the light absorbing circumferential wall may have a different shape, e.g. a prism shape. The further absorbing surfaces 350 and/or 350' are in the shape of cylindrical rings and may be used around the first and/or second light source 100 and/or 100' to absorb lateral light emissions. The first and second supports 200 and 200' may not cover the complete section of the protector 300 leaving a small gap between the support 200, 200' and the protector 300 such that light may travel from the lower half of the protector 300 towards the upper half of the protector 300 through said gap. The cylindrical light absorbing rings 350, 350' may reduce that phenomenon by surrounding the supports 200, 200', and/or the light sources 100, 100', and/or the diffusers 120, 120', and/or the Louver elements 130, 130', and/or the rods 701, 702, and/or the light absorbing element 340 in case of light absorbing ring 350'. The cylindrical light absorbing rings 350, 350' may have a black inner surface facing the light sources 100, 100' and an outer surface of a similar or different colour.

The rings 350, 350' may enclose the rods 701 and 702, such that the rings can be slid into place around the rods 701 and 702. The rings 350, 350' may be further fixed to the two rods 701 and 702 directly or indirectly via their respective support 200, 200'. In particular the ring 350' may comprise connecting means 351' and 352' in the form of connecting tabs for fixing the ring 350' to the support 200' using for instance screws or other appropriate means. A similar arrangement may be used for connecting the ring 350 to the support 200.

The diffuser 120, 120' may also be provided with apertures for mechanical connection to the respective support 200, 200'. The diffuser 120, 120' may be a substantially flat plate. The diffuser 120, 120' and the ring 350, 350' may be fixed to the respective support 200, 200' together using for instance a spacer and appropriate connecting elements interconnecting the respective support 200, 200', the ring 350, 350' and the diffuser 120, 120' in a stacked manner.

Where possible, the embodiment of FIGS. 8, 9 and 10 may be combined with previous embodiments.

According to a further embodiment, the light absorbing surface 340 may be a light absorbing coating arranged on an internal surface of the protector 300. Such an arrangement may be used on its own or combined with any of the previous embodiments.

According to a further embodiment the light absorbing surface 340 is part of the protector self. The protector may be made of a material with two light absorbing characteristics by addition of pigments for instance, or may be made of two materials with different light absorbing characteristics. Such an arrangement may also be used on its own or combined with any of the previous embodiments.

Optionally, a light absorbing circumferential wall (not shown) may be provided around the light source, in order to absorb a portion of the light emitted at large incident angles. The light absorbing circumferential wall may extend over a small distance into the protector 300. The light absorbing circumferential wall may be provided around one or more PCB's with LEDs. For example, the one or more PCB's may be arranged on the support 200, 200', preferably a light absorbing support 200, 200', and the light absorbing circumferential wall may protrude downward around the one or more PCB's to absorb a portion of the light emitted at large incident angles. The one or more PCB's may have any shape. For example a single rectangular or polygonal PCB may be provided. In a particular example the PCB may have the shape of a house (combination of a rectangle and a trapezoid), and the light absorbing circumferential wall may then also have the shape of a house.

Whilst the principles of the invention have been set out above in connection with specific embodiments, it is understood that this description is merely made by way of example and not as a limitation of the scope of protection which is determined by the appended claims.

The invention claimed is:

1. A luminaire assembly comprising:

a light source;

a support for carrying the light source; and a protector for protecting the light source from external environmental influences, the protector having an open top for accommodating the support, a bottom facing the light source, and a peripheral wall between the open top and the bottom, the peripheral wall comprising a transparent or translucent portion, and the light source being configured to send light in use through said portion of the peripheral wall, wherein the protector is provided with a light absorbing surface arranged inside of the protector and facing the light source, the light absorbing surface being configured such that in use part of the light emitted from the light source is absorbed by the light absorbing surface to reduce upward light pollution.

2. The luminaire assembly according to claim 1, wherein the light absorbing surface is configured to absorb more than 80% of visible light that is emitted on the surface thereof.

3. The luminaire assembly according to claim 1, wherein the light absorbing surface is part of a separate element located in an inner area delimited by the peripheral wall of the protector.

4. The luminaire assembly according to claim 1, wherein the light absorbing surface extends over at least 90% of a surface of a section through the peripheral wall of the protector.

5. The luminaire assembly according to claim 1, wherein the light absorbing surface is in a lower half of the protector and/or wherein the light absorbing surface is on or near the bottom.

6. The luminaire assembly according to claim 1, further comprising a second light source and a second support with the second light source arranged on a lower surface thereof, said second support being arranged between the bottom and the support, wherein the light absorbing surface is arranged above the second support.

7. The luminaire assembly according to claim 1, wherein the light absorbing surface is mounted tight inside an inner area delimited by the peripheral wall of the protector.

8. The luminaire assembly according to claim 1, wherein the protector is made of plastic and the light absorbing surface is made of metal or plastic, and/or wherein a rigidity of the material of the light absorbing surface is higher than a rigidity of the material of the protector.

9. The luminaire assembly according to claim 1, wherein the light absorbing surface is adhered to a surface located in an inner area delimited by the peripheral wall of the protector.

10. The luminaire assembly according to claim 1, wherein the light absorbing surface is provided with a collar extending adjacent the peripheral wall of the protector, and/or wherein a surface area delimited by the open top of the protector is larger than a surface area of the bottom of the protector.

11. The luminaire assembly according to claim 1, wherein the peripheral wall has one of a conical shape and a cylindrical shape, and/or wherein the light absorbing surface is part of a light absorbing coating located in an inner area delimited by the peripheral wall of the protector, and/or wherein the light absorbing surface is a surface of the protector.

12. The luminaire assembly according to claim 1, comprising at least two brackets extending between the support and the bottom, and/or wherein the luminaire assembly comprises at least one hollow rod extending inside the protector between the support and the bottom.

13. A lamp post comprising a luminaire assembly according to claim 12, further comprising a support pole arranged below the protector, wherein the at least two brackets have a lower end connected to the support pole.

14. The luminaire assembly according to claim 1, wherein a light absorbing circumferential wall is provided in the protector, around the light source.

15. A modular lamp post comprising a plurality of pole modules arranged one above the other along a central axis, wherein said plurality of pole modules comprise a light module comprising a luminaire assembly according to claim 1.

16. The modular lamp post according to claim 15, said light module comprising:

a housing comprising a lower section, a middle section, and an upper section, wherein the middle section comprises the protector, wherein the support carrying the light source is arranged in an upper part of the housing, near said upper section, wherein the lower section comprises a connection interface configured to connect the light pole module to a lower pole module of said plurality of pole modules.

17. The modular lamp post according to claim 16, further comprising a second support carrying a second light source, said second support being arranged at a distance of the support, in a middle part of the housing between the upper and lower section.

18. The modular lamp post according to claim 15, further comprising at least two rods connecting the lower section to the upper section, and/or wherein a cylindrical light absorbing ring is provided in the protector, around the light source and/or around the second light source.

19. A luminaire assembly comprising:

a first light source;

a protector for protecting the first light source from external environmental influences, the protector having an open top for accommodating the first light source, a bottom, and a peripheral wall between the open top and the bottom, the peripheral wall comprising a transparent or translucent portion, and the first light source being configured to send light in use through said portion of the peripheral wall;

a second light source; and a support with the second light source arranged on a lower surface thereof, said support being arranged between the bottom and the open top, wherein the protector is provided with a light absorbing surface arranged inside of the protector, above the support, and facing the first light source.

20. A luminaire assembly comprising:

a light source; and a protector for protecting the light source from external environmental influences, the protector having an open top for accommodating the light source, a bottom facing the light source, and a peripheral wall between the open top and the bottom, the peripheral wall comprising a transparent or translucent portion, and the light source being configured to send light in use through said portion of the peripheral wall, wherein a cylindrical light absorbing ring is provided in the protector, around the light source.

* * * * *